F. DRAPER.
Lamp.
No. 2,424.
Patented Jan'y 17, 1842.
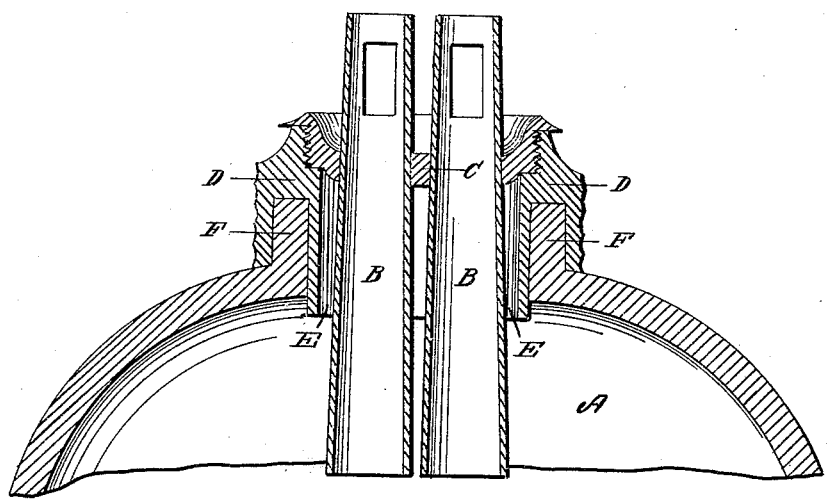

UNITED STATES PATENT OFFICE.

FRANCIS DRAPER, OF EAST CAMBRIDGE, MASSACHUSETTS.

CONSTRUCTION OF THE CAPS OF GLASS LAMPS.

Specification of Letters Patent No. 2,424, dated January 17, 1842.

*To all whom it may concern:*

Be it known that I, FRANCIS DRAPER, of East Cambridge, in the county of Middlesex, in the State of Massachusetts, have invented a new and useful Improvement in Lamp-Caps, of which the following is a full and exact description and which, taken in connection with the accompanying drawing, forms my specification.

In the same I have set forth the nature and principles of my improvement, by which it may be distinguished from others of a like character, together with such portion of the same as I claim and for which I solicit Letters Patent.

My improvement is exhibited in the accompanying drawing, which represents a vertical section of the cap and wick tubes of a glass lamp as attached to the top of the oil chamber A.

B, B, are the wick tubes inserted in the milled screw C the whole of the same being constructed in the usual manner and screwed into the cap D D.

My improvement consists in forming the cap D D with an internal tube E E which shall extend down or around the inside of the neck F F of the oil chamber or that portion of the lamp to which the cap is usually cemented as seen in the drawing. The cement thus adheres to the outer surface of this tube as well as the inner surface of the cap D D, and this addition of the tube or collar E E prevents the oil which usually oozes from the top of the wick tubes and passes back into the lamp, from being insinuated, at the top of the oil chamber, to an injurious degree into the cement and thus destroying its adhesion to the cap and neck, as is the case in the common methods of arranging the cap upon the same. The tube or collar E E, if deemed necessary may extend a short distance below the neck or into the oil chamber A, whereby the oil will drop into the chamber without coming into contact with the cement of the neck to an injurious extent.

I claim, in the above, as my invention—

The internal tube or collar applied to the cap of a lamp and extending downward, through the neck of the oil chamber, the same being constructed substantially in manner and for the purposes herein above set forth.

In testimony that the foregoing is a true description of my said invention and improvement I have hereto set my signature this twenty first day of December in the year eighteen hundred and forty one.

FRANCIS DRAPER.

Witnesses:
R. H. EDDY,
CALEB EDDY.